United States Patent
Evans et al.

(10) Patent No.: US 7,699,367 B2
(45) Date of Patent: Apr. 20, 2010

(54) ENERGY ABSORBER WITH CRUSH BOXES AND BACK STRAPS

(75) Inventors: Darin Evans, Spring Lake, MI (US); Jeffery T. Burke, Jackson, MI (US); Kenneth R. Bastien, Brighton, MI (US); Kevin E. Holdren, Tecumseh (CA); Daniel D. Ralston, Farmington Hills, MI (US); David Gorman, Royal Oak, MI (US)

(73) Assignee: NetShape Energy Management, LLC, Novi, MI (US)

( * ) Notice: Subject to any disclaimer, the term of this patent is extended or adjusted under 35 U.S.C. 154(b) by 61 days.

(21) Appl. No.: 12/024,132

(22) Filed: Feb. 1, 2008

(65) Prior Publication Data

US 2008/0185851 A1    Aug. 7, 2008

Related U.S. Application Data

(60) Provisional application No. 60/887,851, filed on Feb. 2, 2007.

(51) Int. Cl.
B60R 19/03 (2006.01)
(52) U.S. Cl. .................... 293/120; 293/102
(58) Field of Classification Search ............ 296/187.04, 296/187.03, 187.09; 293/120, 132, 121, 293/109, 110; 280/751, 805
See application file for complete search history.

(56) References Cited

U.S. PATENT DOCUMENTS

| | | | | |
|---|---|---|---|---|
| 3,638,985 A * | 2/1972 | Barton et al. | ............... | 293/122 |
| 3,779,592 A * | 12/1973 | Golze et al. | ................. | 293/120 |
| 3,827,740 A * | 8/1974 | Golze et al. | ................. | 293/120 |
| 3,843,182 A * | 10/1974 | Walls et al. | ................. | 293/122 |
| 3,857,595 A * | 12/1974 | Plegat | ......................... | 293/137 |
| 3,884,516 A * | 5/1975 | Gallion et al. | .............. | 293/120 |
| 4,076,296 A * | 2/1978 | Ditto et al. | .................. | 293/122 |
| 4,079,975 A | 3/1978 | Matsuzaki et al. | | |
| 4,116,480 A | 9/1978 | Crestetto | | |
| 4,116,893 A * | 9/1978 | Flanagan | .................... | 521/137 |
| 4,154,469 A * | 5/1979 | Goupy et al. | ................ | 293/120 |
| 4,328,986 A * | 5/1982 | Weller et al. | ................ | 293/120 |
| 4,424,996 A * | 1/1984 | Yoshiyuki | ................... | 293/117 |
| 4,482,180 A * | 11/1984 | Huber et al. | ................ | 293/120 |
| 4,533,166 A * | 8/1985 | Stokes | ........................ | 293/120 |
| 4,597,601 A * | 7/1986 | Manning | .................... | 293/122 |
| 4,652,036 A | 3/1987 | Okamoto et al. | | |
| 4,925,224 A * | 5/1990 | Smiszek | ..................... | 293/120 |
| 4,940,270 A * | 7/1990 | Yamazaki et al. | .......... | 293/122 |
| 4,998,761 A * | 3/1991 | Bayer et al. | ................. | 293/121 |
| 5,106,137 A * | 4/1992 | Curtis | ........................ | 293/107 |
| 5,114,198 A * | 5/1992 | Yamashita et al. | ......... | 293/120 |
| 5,290,079 A | 3/1994 | Syamal | | |

(Continued)

*Primary Examiner*—Kiran B. Patel
(74) *Attorney, Agent, or Firm*—Price, Heneveld, Cooper, DeWitt & Litton, LLP (57) ABSTRACT

An energy absorber includes a base flange and elongated crush boxes that to form a substantially continuously face surface on the energy absorber. Back straps are attached across a back of the crush boxes to prevent unacceptable spreading of the side walls of the crush boxes during an impact. The back straps can be integrally formed when the energy absorber is molded, and can include a living hinge at one end and a free end that can be bent over and snap attached during post-molding assembly without additional secondary operations. Alternatively, a separate wall-stabilizing thermoformed component is sandwiched between the energy absorber and beam.

15 Claims, 8 Drawing Sheets

U.S. PATENT DOCUMENTS

| | | | |
|---|---|---|---|
| 5,383,341 A * | 1/1995 | Zur et al. .................. 62/476 |
| 5,441,319 A * | 8/1995 | Oyama et al. .............. 293/155 |
| 5,507,540 A | 4/1996 | Pernot |
| 5,580,109 A | 12/1996 | Birka et al. |
| 6,065,786 A * | 5/2000 | Wheatley .................. 293/109 |
| 6,082,792 A | 7/2000 | Evans et al. |
| 6,312,028 B1 * | 11/2001 | Wilkosz .................... 293/133 |
| 6,398,275 B1 | 6/2002 | Hartel et al. |
| 6,406,081 B1 * | 6/2002 | Mahfet et al. ............. 293/133 |
| 6,416,114 B1 | 7/2002 | Topker et al. |
| 6,554,332 B1 | 4/2003 | Schuster et al. |
| 6,609,740 B2 * | 8/2003 | Evans ....................... 293/121 |
| 6,669,251 B2 * | 12/2003 | Trappe ...................... 293/120 |
| 6,688,661 B2 * | 2/2004 | Yamamoto ................. 293/102 |
| 6,695,366 B2 * | 2/2004 | Cherry ...................... 293/120 |
| 6,726,262 B2 | 4/2004 | Marijnissen et al. |
| 6,746,061 B1 * | 6/2004 | Evans ....................... 293/120 |
| 6,779,821 B2 * | 8/2004 | Hallergren ................. 293/133 |
| 6,866,313 B2 * | 3/2005 | Mooijman et al. ......... 293/120 |
| 6,874,832 B2 | 4/2005 | Evans et al. |
| 6,877,785 B2 * | 4/2005 | Evans et al. ............... 293/120 |
| 6,926,321 B2 * | 8/2005 | Zipfel ....................... 293/102 |
| 6,938,936 B2 * | 9/2005 | Mooijman et al. ......... 293/120 |
| 6,949,209 B2 * | 9/2005 | Zander et al. .............. 264/51 |
| 6,997,490 B2 * | 2/2006 | Evans et al. ............... 293/120 |
| 7,134,700 B2 * | 11/2006 | Evans ....................... 293/120 |
| 7,163,242 B2 * | 1/2007 | Shuler et al. .............. 293/120 |
| 7,222,896 B2 * | 5/2007 | Evans ....................... 293/120 |
| 7,494,165 B2 * | 2/2009 | Evans et al. ............... 293/102 |
| 7,537,252 B2 * | 5/2009 | Nagai et al. ............... 293/102 |
| 2004/0169381 A1 * | 9/2004 | Evans et al. ............... 293/121 |
| 2004/0256867 A1 | 12/2004 | Evans et al. |
| 2005/0213478 A1 * | 9/2005 | Glasgow et al. ........... 369/262 |
| 2005/0269823 A1 * | 12/2005 | DeVoursney et al. ...... 293/102 |
| 2006/0043743 A1 | 3/2006 | Shuler et al. |
| 2006/0244273 A1 * | 11/2006 | Evans ....................... 293/102 |
| 2006/0261611 A1 * | 11/2006 | Mohapatra et al. ........ 293/107 |
| 2006/0290150 A1 * | 12/2006 | Roll et al. ................. 293/133 |
| 2007/0024069 A1 * | 2/2007 | Takagi et al. .............. 293/102 |
| 2007/0108778 A1 * | 5/2007 | Evans et al. ............... 293/120 |

\* cited by examiner

ENERGY ABSORBER WITH CRUSH BOXES AND BACK STRAPS

This application claims benefit under 35 U.S.C. §119(e) of provisional application Ser. No. 60/887,851, filed Feb. 2, 2007, entitled ENERGY ABSORBER WITH CRUSH BOXES AND BACK STRAPS, the entire contents of which are incorporated herein.

BACKGROUND

The present invention relates to energy absorbers with crush boxes and back straps for stabilizing the crush boxes for improved energy-absorbing functionality.

Polymeric energy absorbers are often used on a face of metal bumper beams to provide energy-absorption during a vehicle crash (prior to deformation of the metal beam). Recently, many energy absorbers have incorporated geometrically-shaped tubular crush boxes configured to crush in localized areas with optimal and predictable energy absorption. Crush boxes typically have four (or more) relatively planar walls that extend parallel a direction of expected impact to form a tubular shape, and have an end wall connecting the planar walls to form a box-shaped structure. The walls all support each other to promote a predictable crush-type collapse (with multiple bends in each wall during collapse) for maximum energy absorption. A problem is that, as crush boxes are elongated in a sideways direction perpendicular to the direction of expected impact, their side walls are also elongated and soon become unstable. Specifically, as the side walls are elongated, a stability provided by adjacent side walls and the end wall is decreased, especially in the center of the elongated side wall. Concurrently, energy absorption by the elongated side walls during an impact drops off, because the side walls, especially at locations away from the adjacent side walls, begin to kick outward instead of crushing. Restated, during impact, the crush box's elongated side walls (which form a C-shaped cross section with the associated end wall) tend to spread apart (i.e., the top side wall bends upward, and the bottom side wall bends downward), resulting in a substantial reduction in impact energy absorption.

However, there are reasons to elongate crush boxes in a sideways direction (i.e., in a direction parallel a length of the bumper beam on which the energy absorber is positioned). For example, it is desirable to provide continuous support for fascia across a face of the energy absorber, without interruption of the face surface. This is not possible where adjacent crush boxes are spaced apart since there is a gap between adjacent (spaced-apart) crush boxes. Further, it is desirable to provide a more continuous support structure cross a face of the energy absorber so as to provide a more uniform surface if a pedestrian is struck. Still further, there is a desire to reduce the complexity of energy absorbers, such as by reducing a number of the individual crush boxes (and reducing the number of side walls and reinforcement ribs that must concurrently be made). Reducing the number of walls in an energy absorber simplifies tooling and also increases moldability due to the reduction in complexly-shaped surfaces in the mold. Also, protrusions in a die that are bound on four sides (e.g., the die component forming the inside cavity of a crush box) are difficult to cool since it is difficult to route cooling lines into and out of the protrusions.

Thus, an energy absorber and related method is desired solving the aforementioned problems and having the aforementioned advantages. Specifically, an energy absorber is desired having elongated crush boxes, but with reduced tendency of the crush boxes to "spread" unacceptably during an impact, resulting in unacceptably low energy absorption.

SUMMARY OF THE PRESENT INVENTION

In one aspect of the present invention, an energy-absorbing article for a vehicle includes a base flange that, when in a car-mounted position, defines an abutment surface extending in a longitudinal direction and in a vertical direction and that is adapted to be positioned on a face surface of a bumper beam. The energy absorber further includes a hollow crush box extending from the base flange in a fore-aft direction and that is configured to absorb energy upon impact in the fore-aft direction. The crush box includes top and bottom horizontal side walls and opposing vertical side walls and further includes an end wall connecting outer edges of the horizontal and vertical side walls to define a rearwardly-open cavity. At least one back strap is attached across a rear of the rearwardly-open cavity of the hollow crush box. The back strap anchors rear edges of the top and bottom horizontal side walls together near the base flange at a location spaced from the vertical side walls to prevent unacceptable separation of the rear edges of the top and bottom horizontal side walls upon an impact in the fore-aft direction against the energy absorber.

In another aspect of the invention, an energy-absorbing apparatus for a vehicle includes a reinforcement beam for the vehicle, and an energy absorber abutting a front of the beam and including at least one hollow crush box configured to absorb energy upon impact in a fore-aft direction; the crush boxes each including top and bottom horizontal side walls and opposing vertical side walls and including an end wall connecting outer edges of the horizontal and vertical side walls to define a rearwardly-open cavity. A second wall-stabilizing component defines at least one back strap extending across a rear of the rearwardly-open cavity of one of the hollow crush boxes. The energy absorber includes fasteners that extend through the component and into the beam to anchor rear edges of the top and bottom horizontal side walls together to prevent unacceptable separation of the rear edges of the top and bottom horizontal side walls during an impact in the fore-aft direction against the energy absorber.

These and other aspects, objects, and features of the present invention will be understood and appreciated by those skilled in the art upon studying the following specification, claims, and appended drawings.

DETAILED DESCRIPTION OF PREFERRED EMBODIMENTS

A vehicle bumper 15 (FIG. 1) includes a B-shaped metal reinforcement beam 16 having a face surface 17, a fascia 18 for aesthetically covering the bumper 15, and an energy absorber 20 engaging the face surface 17 and supporting the fascia 18. The present energy absorber 20 is made with three (or potentially more or less) elongated crush boxes 21 (also often called "crush lobes" in the industry) that are elongated in a cross-car direction along a face of the beam 16 to form a substantially continuous face surface on the energy absorber 20. Notably, the center crush box 21 is symmetrical and nearly rectangular in shape, while the outboard crush boxes 21 are somewhat wedge-shaped to have a curved-profile with a narrower fore-aft dimension on their outboard ends so that the energy absorber fits well into the aerodynamic curved shape found in many modern vehicle bumpers. Each crush box 21 is formed by a plurality of walls forming a geometric tubular shape, such as a rectangular 4-sided box. The walls can be planar, or may include corrugations for increased strength. Especially the top and bottom walls are often made to include corrugations or waves, as is known in the art.

Figure 4:
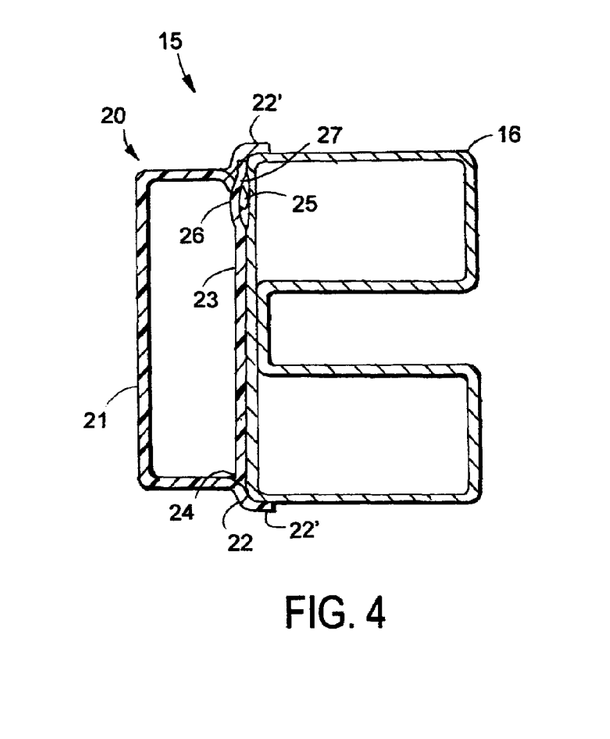
FIG. 4 is a cross-sectional view along the line IV-IV in FIG. 1.

The illustrated energy absorber 20 (FIG. 4) includes a base flange 22 with top and bottom overlap flanges 22' configured to matingly engage the face surface 17 of the beam 16, with the crush boxes 21 formed from the base flange 22 to extend in a forward direction. The illustrated energy absorber 20 is made of polymeric material and is formed by a thermoforming process, such as vacuum forming. However, it is contemplated that it could also be made by other processes, such as by injection-molding processes. It is contemplated that energy absorbers could be formed by many other means, such as by thermal forming, compression molding, and other molding processes. A plurality of integrally-formed back straps 23 are attached by an integrally-formed living hinge 24 at one end and are mechanically snap-attached by a hook 25 and aperture 26 at their free end such that they can be bent over and snapped during assembly without the need for additional secondary operations. In the illustrated arrangement, a tip of the hook 25 faces inwardly so that upon impact (i.e., when the side walls are biased to spread apart), the force of the impact causes the tip of the hooks 25 to move into greater engagement (rather than to move toward a release position). Also, an abutment 27 adjacent the aperture 26 resiliently biases the hook 25 into secure engagement reducing a risk that it will be accidentally released.

Figure 12:
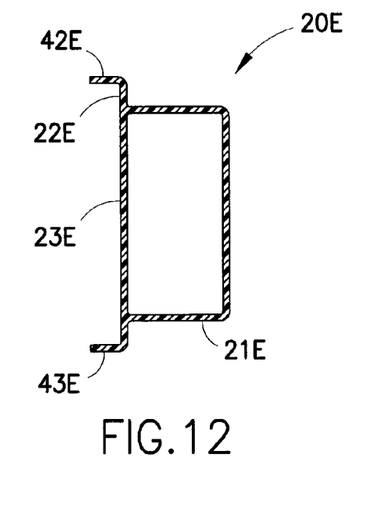
FIGS. 12 and 13 are cross-sectional views taken along the lines XII-XII and XIII-XIII in FIG. 11.
Figure 13:
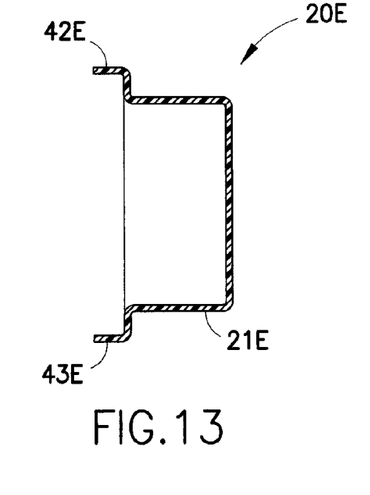

It is contemplated that the straps (23) could be attached by several different mechanisms rather than snap attachment, such as by using heat staking, ultrasonic welding, vibration welding, other bonding methods, stapling, hook-attachment, rivets, fasteners, other mechanical attachment methods, and/or by any other attachment technique. It is contemplated that the straps 23 could be made as separate components (i.e., the living hinge 24 is eliminated), such that both ends of the straps 23 are attached across a rear of the crush box 21 during assembly to the energy absorber 20. It is contemplated that the straps 23 can be placed at any spacing and can be any shape as needed for the particular functional requirements of the energy absorber 20. Also, it is contemplated that the straps could be integrally formed across a rear of the crush boxes in an as-molded condition, such as by using slides in an injection molding die, as described below in regard to FIGS. 11-13.

The illustrated crush boxes 21 have a fore-aft length of about 3 inches in the center area and about 1½ inches near their ends. Their vertical height is about 4½ inches. A length of the energy absorber 20 is about 48 to 52 inches and it is arcuately shaped to match the aerodynamic shape of a front of a vehicle. The crush boxes 21 are elongated in a sideways direction (i.e., parallel a length of the metal beam 16) by at least 2-3 times and more preferably about 5-10 times or more. The illustrated center crush box is about 20 inches long, while the outboard two crush boxes are about 14 inches long.

The back straps 23 each extend across the cavity of the associated crush box 21 and are sufficient in thickness, size and width to anchor the vertically-spaced horizontally-extending side walls together inboard of the vertical side walls. Thus, the back straps 23 prevent unacceptable separation and spreading of the horizontal side walls upon an impact in the fore-aft direction against the bumper system. The number and location of the back straps 23 are designed to achieve a desired level of stability of the top and bottom side walls of the crush boxes 21. As illustrated, the back straps 23 are about ½ inch to about 1 inch wide and are located along the energy absorber 20 at about every 5 inches or so . . . which is about a depth of the side walls that they connect. However, it is contemplated that the back straps 23 can be spaced farther apart, such as every 6 to 8 inches, or closer together if desired. It is contemplated that the thickness of the back straps 23 and base flange 22 will be about the same, but these also can be varied if a particular design requires a different structure.

Elongate action of the crush boxes 21 in a cross-car direction (i.e., in a direction parallel a length of the energy absorber) is considered significant for several reasons. An elongated crush box is easier to form, thus speeding manufacture cycle times, reducing tooling costs and lead times, and lowering overall maintenance and manufacturing costs. Also, the straps greatly increase energy absorption and increase an efficiency of energy absorption upon impact, giving a thin-walled thermoformed energy absorber the functional energy-absorbing capability required of heavier impact applications.

Also, the straps are easy to tune, easy to locate as necessary, and have other manufacturing advantages that reduce lead times, tooling costs and manufacturing cycle times.

Figure 5:
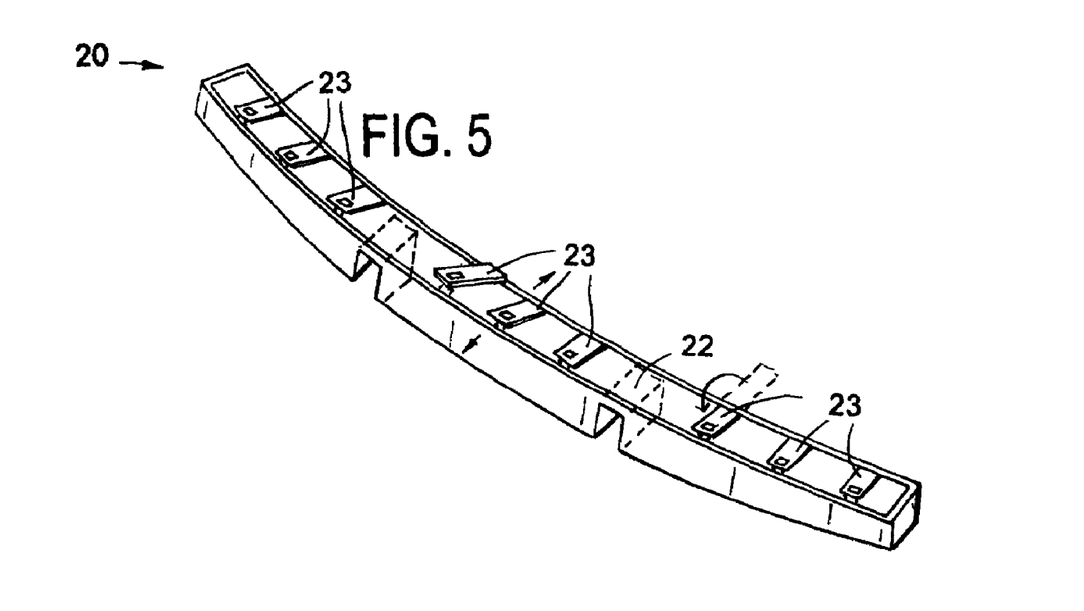
FIG. 5 is a perspective view of a rear of the energy absorber of FIG. 2 with the plurality of back straps only partially snapped into their anchoring position.
Figure 5A:
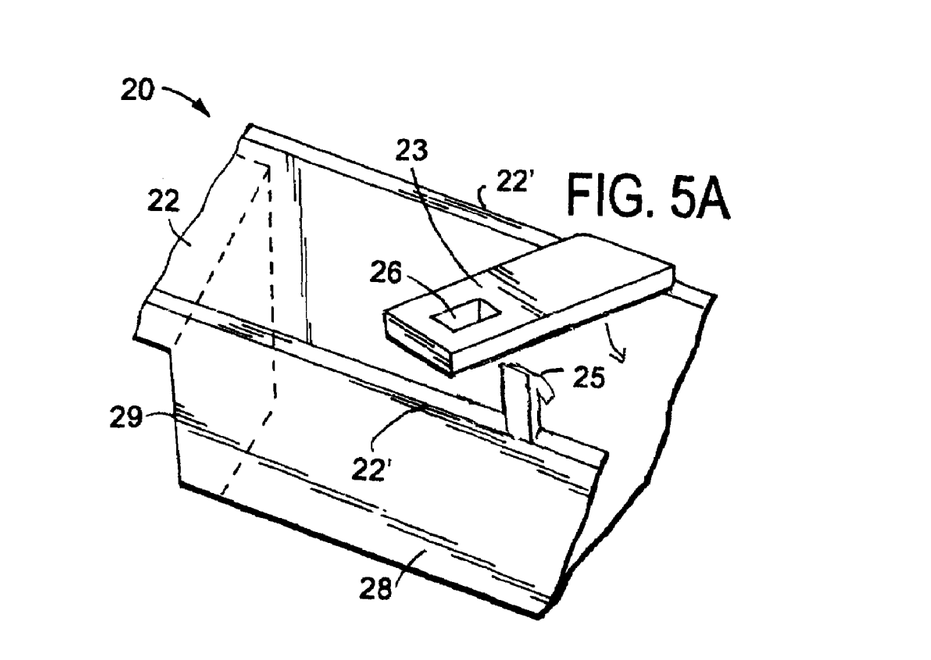
Figure 6:
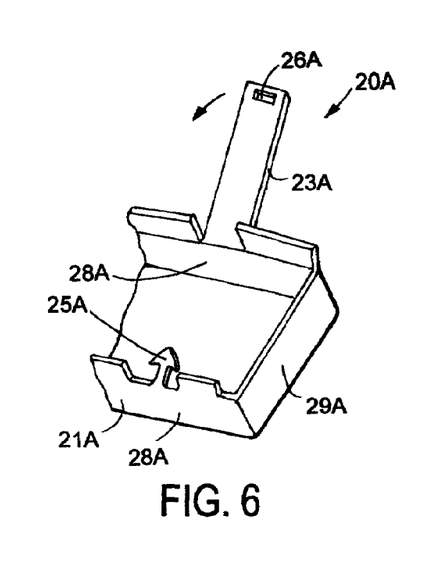
FIGS. 6-6A are fragmentary perspective views of an alternative vacuum-formed-and-die-cut energy absorber, FIG. 6 showing the back strap in an unattached as-molded position and FIG. 6A showing the back strap in an attached anchoring position.
Figure 6A:
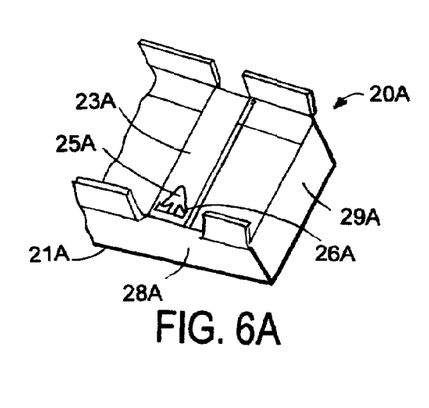

As noted above, the present energy absorber can be thermoformed, injection-molded, or formed in other ways known in the art. Where the energy absorber 20A is thermoformed (FIGS. 6-6A), the back straps 23A and also the aperture 26A for receiving the hook 25A are die-cut from the raw sheet prior to (or after) thermoforming to form the crush boxes 21A. In a thermoformed energy absorber, the elongated side walls 28A and vertical side walls 29A are thinned due to stretching from the base flange (see 22 in FIG. 5) during the thermoforming process. It is also noted that the location of stretch in the side walls 28A and 29A can be controlled by the thermoforming process, such that their thickness can be constant . . . or can be formed to have a decreasing thickness over a length of the side walls 28A and 29A. It is known to control thermoforming processes to achieve a desired wall thickness and profile, and accordingly it is not necessary to describe these processes to persons skilled in this art. Notably, where the energy absorber is injection-molded or compression molded, the wall thickness and thickness profile can also be controlled by tooling design.

Figure 7:
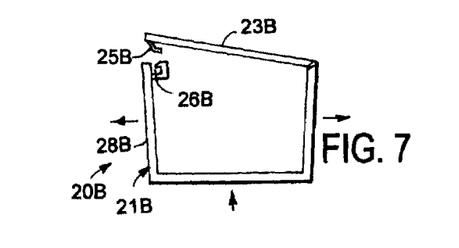
FIGS. 7-7A are fragmentary cross-sectional views of yet another alternative energy absorber, FIG. 7 showing the back strap in an unattached as-molded position and FIG. 7A showing the back strap in an attached anchoring position.
Figure 7A:
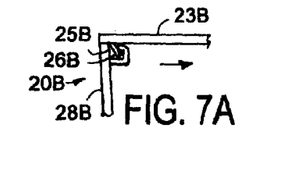

The energy absorber 20B of FIGS. 7-7A is injection-molded to include back straps 23B with a hook 25B on one end that snaps into a groove 26B in the associated side wall 28B of a crush box 21B. Notably, the energy absorber 20B does not require an aperture. Further, the back strap 23B is held in position during a vehicle crash both by the orientation of the hook (which engages with increasing attachment strength when the side walls are biased apart during the crash) and also by the back strap which is positioned against the front face of the reinforcement beam during assembly.

Figure 8:
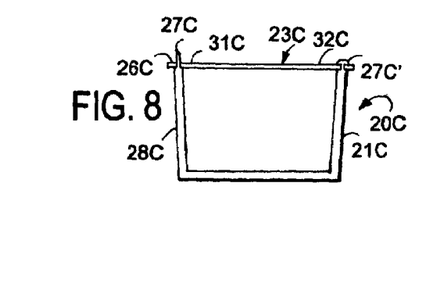
FIGS. 8 and 9 are fragmentary cross-sectional views of two additional alternative energy absorbers, FIG. 8 showing a separate back strap attached by heat-staked protrusions and FIG. 9 showing a separate back strap attached by bonded flanges (such as thermally welded flanges).
Figure 9:
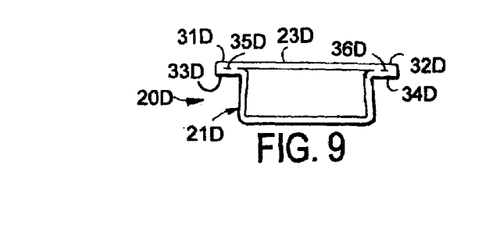

The back straps (23) above are integrally formed as a molded part of the energy absorber. However, it is contemplated that the back straps can be separately formed parts, as illustrated in FIGS. 8-9. In FIG. 8, the energy absorber 20C has a crush box 21C and a back strap 23C where the back straps 23C are separately formed strips. Ends 31C and 32C of the back straps 23C have apertures 26C that receive protrusions 25C extending from the energy absorber 20A. The protrusions 25C are thermally re-formed (such as by a "heat staking" process) to form a mushroomed head 27C' (i.e., rivet-like head) that retains the straps 23C to the energy absorbers, thus securing the assembly together with the back straps holding the side walls 28C of the crush boxes together. It is also contemplated that an energy absorber 20D (FIG. 9) can include crush boxes 21D with separately-manufactured back straps 23D having ends 31D and 32D thermally bonded at locations 35D and 36D to abutting mating flanges 33D and 34D on the energy absorber.

Figure 1:
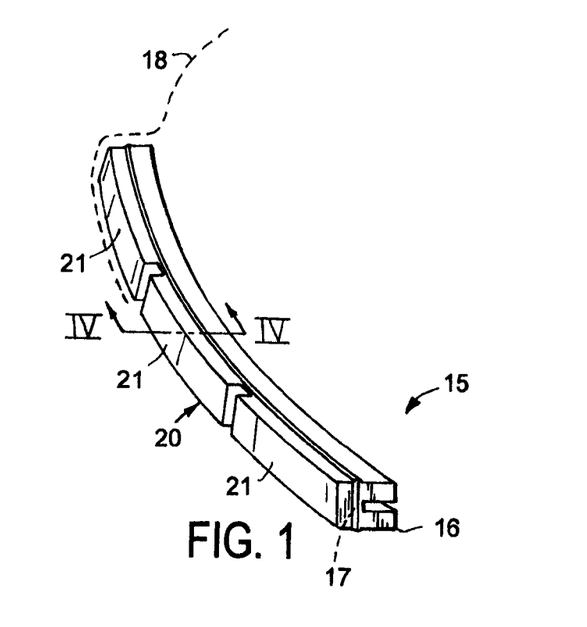
FIG. 1 is a front perspective view of a bumper system incorporating an injection-molded energy absorber on the face of a B-shaped metal tubular beam.
Figure 2:
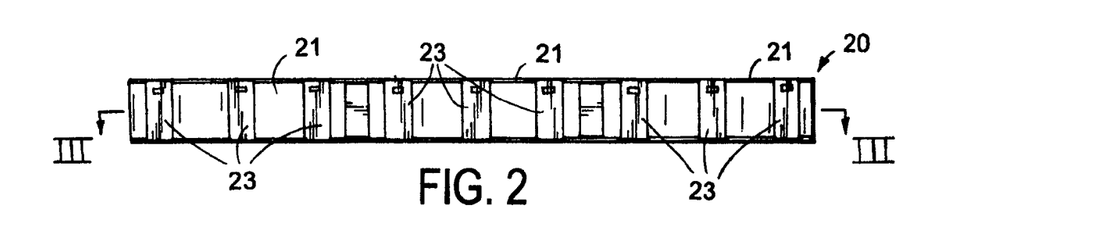
FIG. 2 is a rear view of the energy absorber of FIG. 1.
Figure 3:
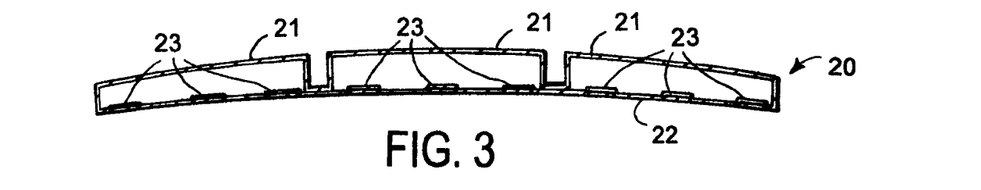
FIG. 3 is a cross-sectional view along the line III-III in FIG. 2.
Figure 10:
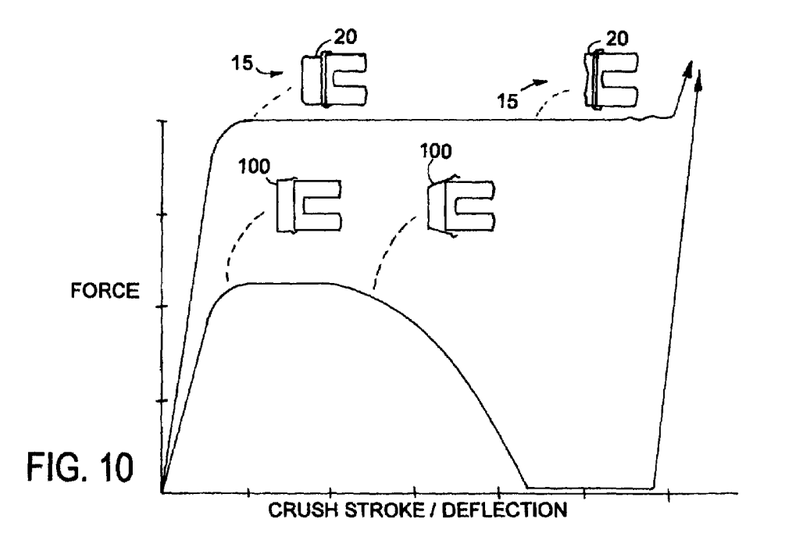
FIG. 10 is a graph showing the force versus impact stroke of two bumper systems, a first bumper system being similar to that shown in FIG. 1 and including back straps that anchor sidewalls of the energy absorber, the second bumper system being similar to that shown in FIG. 1 but not including back straps.

FIG. 10 is a graph comparing energy absorption of two energy absorbers having elongated crush boxes, a curve 40 being for the energy absorber 20 having the back straps of FIG. 1 above, the other energy absorber (100) having similar elongated crush boxes but without any back straps and without stabilization or anchoring of the side walls of the crush boxes. As illustrated, the energy absorber with back straps provides considerably greater energy absorption since its side walls are not permitted to spread apart during impact. Thus, the side walls crush and "crumple" in a manner that provides excellent energy absorption, and does so in a more reliable and consistent manner.

Figure 11:
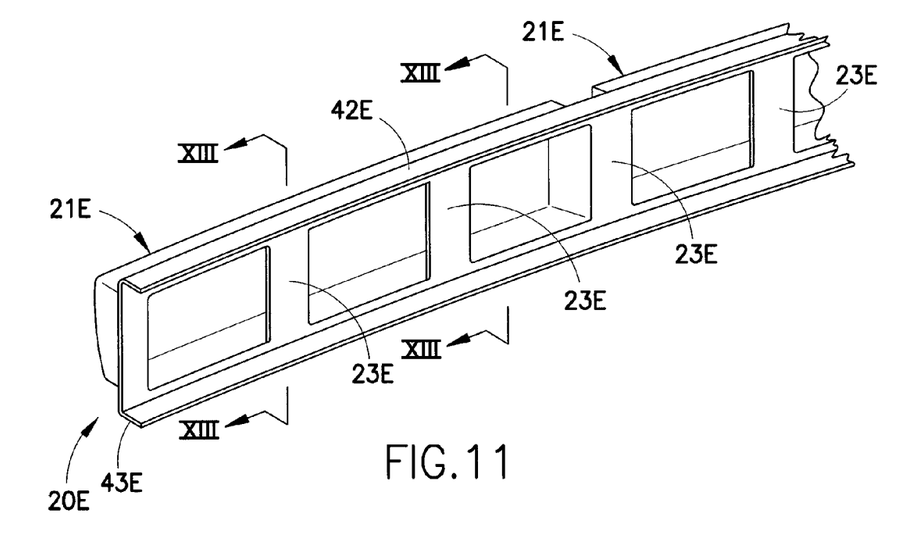
FIG. 11 is a perspective view of another energy absorber with integrally molded-in back straps that extend across a rear of an elongated crush box, such as at two (or more) locations.

FIG. 11 illustrates an energy absorber 20E with elongated crush boxes 21E and two integrally molded back straps 23E located along a length of each crush box 21E. The back straps 23E secure rear edges of the top and bottom walls of the crush boxes together, thus greatly increasing a strength of the crush boxes by preventing premature spreading of the top and bottom walls. This also promotes a more consistent impact energy absorption upon a vehicle impact/crash. It is noted that it is well known in the art of molding to make molding dies with slides and cams for making "blind" areas in a molded part, where the part would otherwise be die-locked. (i.e., The condition of "die lock" is where a molded part cannot be removed from a die because of surfaces on the molded part that interfere with removal of the molded part . . . hence, the part is "locked" on the tool.) In the illustrated energy absorber 20E, the back straps 23E include ends 40E and 41E that are formed by contiguous continuous material of the energy absorber 20E when molded. The molded energy absorber 20E also includes top and bottom flanges 42E and 43E that extend from the base wall/flange 22E, and that assist in keeping the energy absorber 20E on a face of a bumper beam during an impact.

Figure 14:
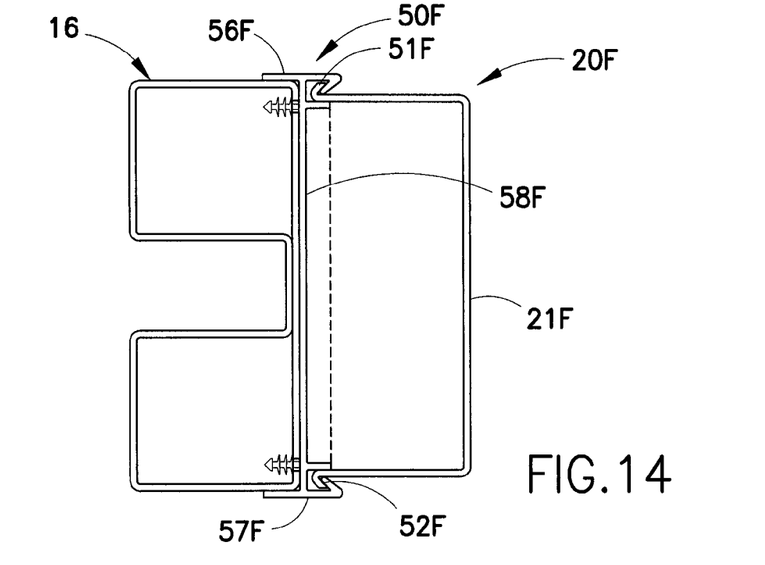
FIG. 14 is an end view of a bumper system including a B-shaped bumper beam, a thermoformed energy absorber, and a holder for holding the energy absorber on the beam.

FIG. 14 illustrates a bumper system including a B-shaped bumper beam 16, an energy absorber 20F, and an injection-molded holder 50F for holding the energy absorber 20F on a face of the beam 16. The illustrated energy absorber 20F is thermoformed by vacuum forming processes, but it is contemplated that it can be made in other ways. The energy absorber 20F includes a base flange 22F, and crush boxes 21F extending from the flange 22F, and outwardly-formed top and bottom flanges 51F and 52F, each with ends 53F and 54F. (Ends 53F and 54F may be flat, or reversely bent.) The holder 50F is an inexpensive flexible part having a first channel portion 56F along its top, a second channel portion 57F along its bottom, and transverse strips 58F that retain the channel portions 56F and 57F together at a desired spacing. The channels 56F and 57F each include a plurality of frictional retainers 59F (commonly referred to in the art as "Christmas tree" fasteners due to their shape). The retainers 59F are located in alignment with holes 59F' in the B beam 16, such that the holder 50F can be quickly attached to the face of a beam 16.

Figure 15:
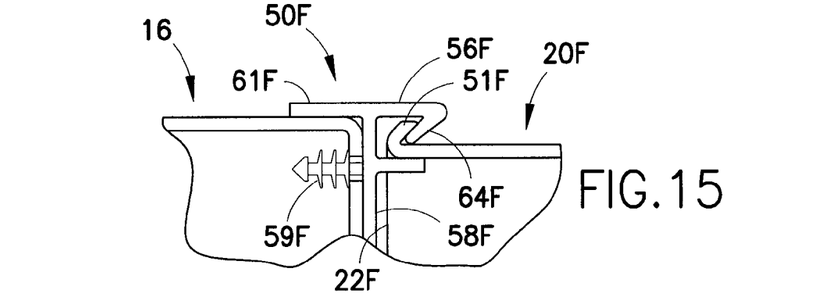
FIG. 15 is an enlarged view of a top portion of FIG. 14.
Figure 16:
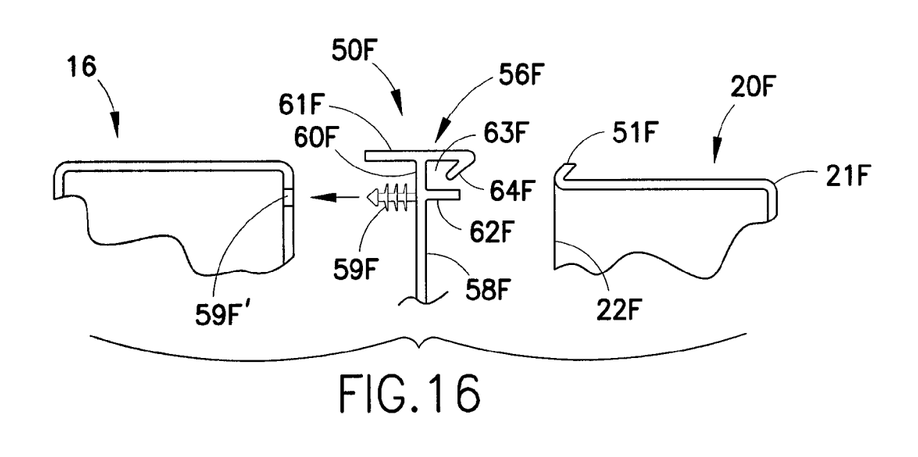
FIG. 16 is an exploded view of FIG. 15.

The top channel portion 56F includes a base flange 60F, an upper flange 61F and a lower flange 62F forming a pocket 63F. (The bottom channel portion 57F includes similar components, and hence only the top channel portion 57F need be described.) The lower flange 62F is notched as needed to allow the walls of a crush box to pass across the area of the flange 62F. The upper flange 61F includes a reversely formed edge portion 64F extending partially over the pocket 63F. The top flange 51F is shaped to slide into the pocket 63F in a "zip-lock" fashion (see FIG. 16), where it is captured by edge portion 64F. (See FIG. 15.)

It is contemplated that a second sheet can be bonded to a back side of the thermoformed energy absorber 50F in place of the back straps. The bonded sheet would act to stabilize the top and bottom walls on crush boxes of the energy absorber, thus preventing premature spreading and thus providing a more predictable impact energy absorption upon impact.

Figures 17, 18:
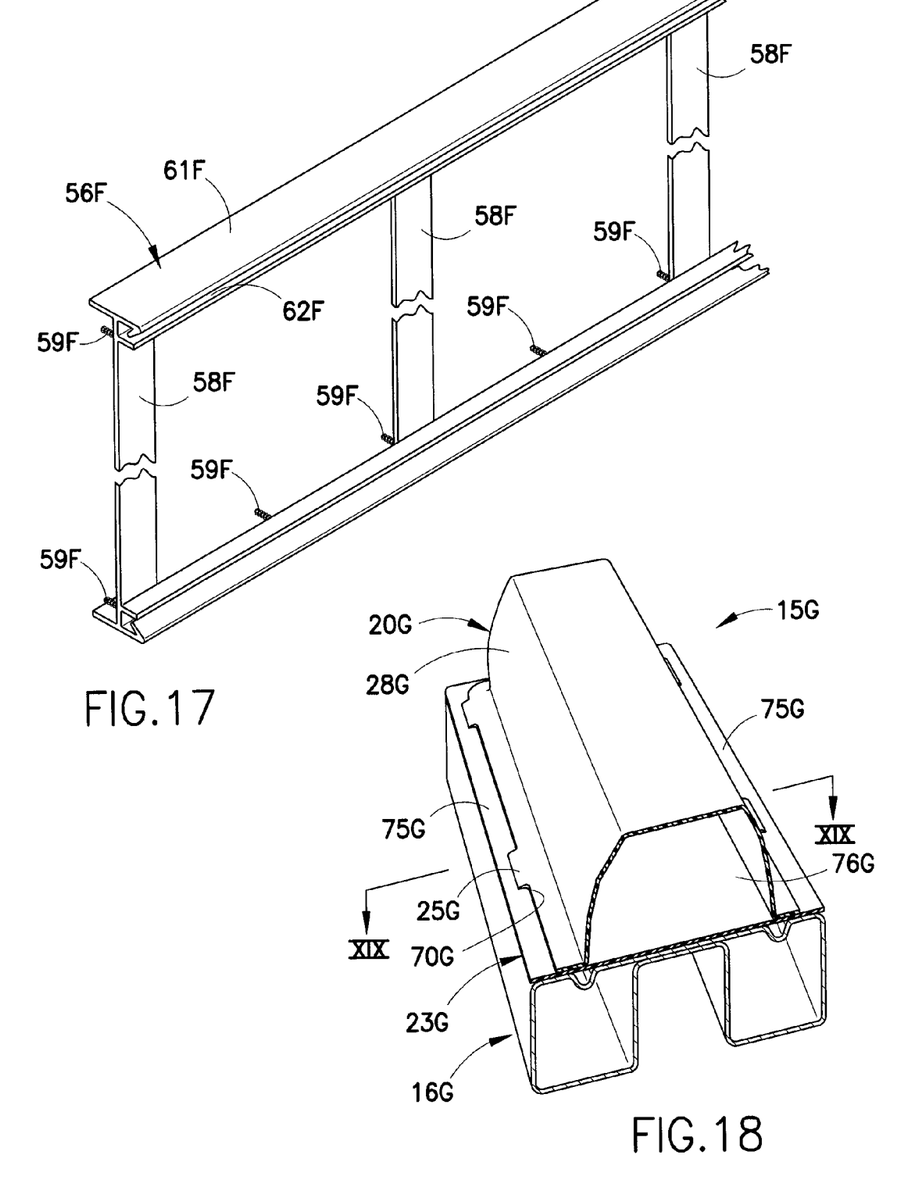
FIG. 17 is a perspective view showing the holder of FIGS. 14-16.
FIG. 18 is a fragmentary perspective view of another embodiment.
Figure 19:
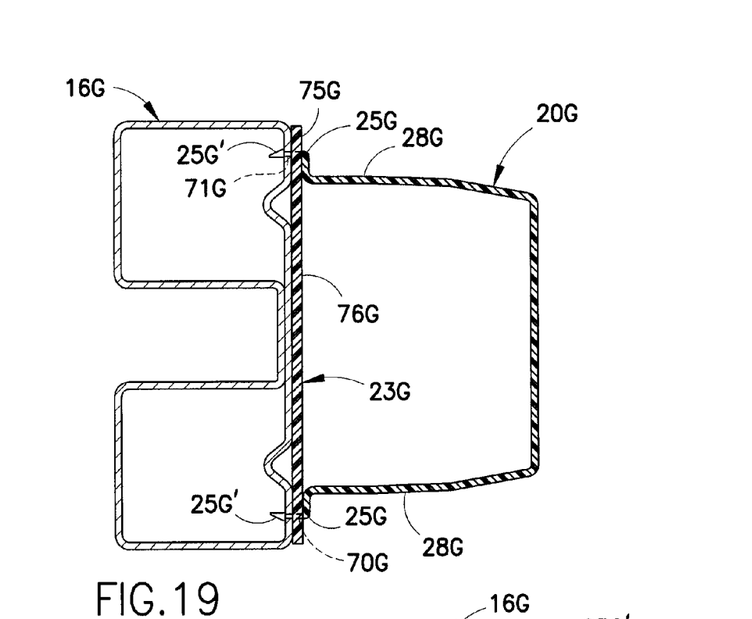
FIG. 19 is a cross section along line XIX in FIG. 18.

FIG. 18 is a fragmentary perspective view of another embodiment, where the bumper 15G includes a metal reinforcement B-shaped beam 16G, an injection molded energy absorber 20G on its face, and a thermoformed sidewall-stabilizing component 23G sandwiched between the beam 16G and energy absorber 20G. The energy absorber 20G includes attachment projections 25G (with barbs 25G' on their ends) that extend through mating apertures 70G in the component 23G into interlocking engagement with top and bottom apertures 71G in the face of beam 16G. The thermoformed component 23G stabilizes the opposing sidewalls 28G of the energy absorber 20G so that the sidewalls 28G do not spread apart during an impact, thus promoting optimal energy absorption. Notably, without the component 23G, the projections 25G would tend to snap off on impact, thus releasing the sidewalls 28G to spread unacceptably and thus greatly reducing energy absorption during impact. An advantage of the present arrangement is that the sidewall-stabilizing component 23G can be easily placed onto the energy absorber 20G, and then an assembly of the component 23G and the energy absorber 20G snapped onto the beam 16G. This greatly reduces cost by minimizing the use of separate fasteners and also by reducing manual labor during assembly.

The illustrated beam 16G is B-shaped, but it is noted that the present construction using an energy absorber and thermoformed wall-stabilizing component can be used on other beam shapes, such as single tube beams, multi-tube beams, and open channel beams.

Figure 21:
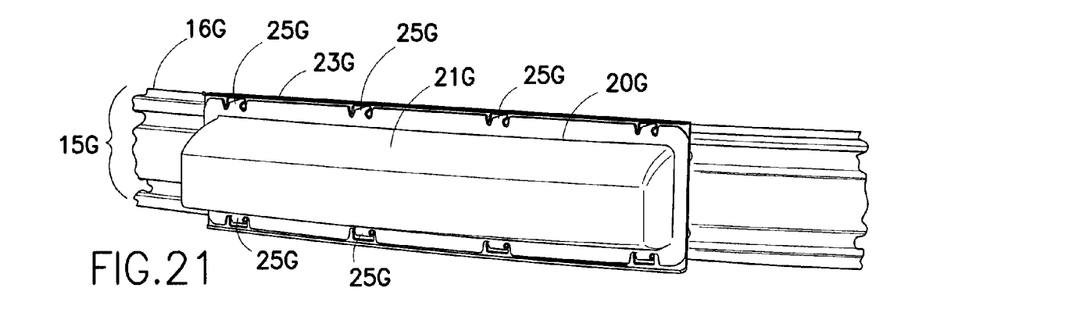
FIG. 21 is a fragmentary perspective view similar to but modified from FIG. 18.

The wall-stabilizing component 23G can be made by various means (e.g., vacuum thermoforming, injection molding, die-cutting, stamping, etc.) and can be different materials (e.g., plastic, metal, composite, etc.). The illustrated component 23G is vacuum thermoformed and includes top and bottom flanges 75G with the apertures 70G and 71G therein, and further includes an area 76G that extends across the crush box 21G. The area 76G adds stability during an impact to help keep the energy absorber 20G on a face of the beam 16G. The enlarged area 76G can extend a length of the crush box 21G, or can be broken into a series of shorter areas. It is also contemplated that the component 23G can extend across an entire length of the beam 16G (FIG. 18), or can be limited to the length of a particular crush box 21G (FIG. 21) (i.e., much shorter than the entire beam's length).

Figure 20:
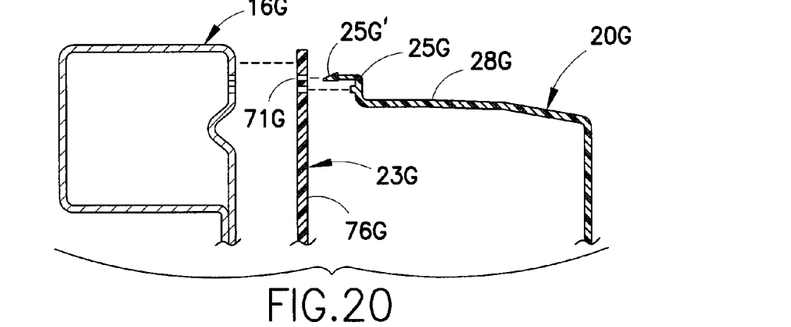
FIG. 20 is a cross section similar to FIG. 19 but slightly in perspective to better show internal items of the cross section.

As noted above, the illustrated energy absorber 20G (FIG. 20) includes attachment projections 25G with barbs 25G' that extend through mating apertures 70G in the component 23G into interlocking engagement with top and bottom apertures 71G in the face of beam 16G. It is contemplated that the projections (25G) can be different configurations and can be retained to the beam 16G in different ways (such as by friction fit, "Christmas tree" type push-in fasteners, etc.). The illustrated energy absorber 20G also has a plurality of short studs (see the stud shown adjacent hook 25G' in FIG. 20) that extends into and terminate in mating holes in the wall-stabilizing component 23G. The short studs can be used between the barbed projections 25G (inline with or offset slightly along the associated flange on the energy absorber) for additional stability without extending into the beam 16G. The short studs can be loosely positioned in their mating holes or friction fit, with the intended purpose being to stabilize the corresponding wall of the energy absorber during an impact. The illustrated barbs 25G' have a reverse hook shape, but it is contemplated that they can also be any desired shape. The illustrated component 23G basically forms one large back strap extending a full length of the crush box 21G. However, a scope of the present invention includes using one or more shorter components 23G instead of a single long component 23G.

It is specifically contemplated that the energy absorber can be much more sophisticated and complicated than the illustrated energy absorber 20G, as will be understood by skilled artisans in the art of bumper design. For example, many energy absorbers are configured to support front fascia of a vehicle and also to provide function, such as retention of wires and/or hardware (i.e., lights, grills, etc.). Also, energy absorbers are commonly designed to provide tuned energy absorption at specific locations, such as for corner impact, front-on post impact, front-on bumper-to-bumper impact, etc. The present component (23G) can be made to fit under any crush box 23G that is sufficiently elongated to require stabilization of its sidewalls 28G, regardless of the crush box's position, shape, or orientation, and regardless of the energy absorber's overall shape. Thus, it is able to accommodate a wide range of designs.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. An energy-absorbing article for a vehicle, comprising:
an energy absorber including a base flange that, when in a car-mounted position, defines an abutment surface extending in a longitudinal direction and in a vertical direction and that is adapted to be positioned on a face surface of a bumper beam, the energy absorber including a hollow crush box extending from the base flange in a fore-aft direction and that is configured to absorb energy upon impact in the fore-aft direction; the crush box including top and bottom horizontal side walls and opposing vertical side walls and including an end wall connecting outer edges of the horizontal and vertical side walls to define a rearwardly-open cavity;
the energy absorber including at least one back strap extending between rear edges of the rearwardly-open cavity of the hollow crush box and securing the rear edges of the top and bottom horizontal side walls together near the base flange, the at least one back strap being located at a location spaced from the vertical side walls and being configured to prevent unacceptable spreading of the rear edges of the top and bottom horizontal side walls upon an impact in the fore-aft direction against the energy absorber.

2. The article defined in claim 1, wherein the crush box is elongated at least five times its height.

3. The article defined in claim 2, wherein the crush box is elongated to at least ten times its height.

4. The article defined in claim 1, wherein the back strap is formed as an integral contiguous portion of the material of the energy absorber.

5. The article defined in claim 1, wherein the back strap includes a living hinge formed at one end.

6. The article defined in claim 5, wherein the back strap has another end attached to one of the horizontal side walls of the crush box of the energy absorber.

7. The article defined in claim 6, wherein the other end includes a snap attach configuration.

8. The article defined in claim 1, wherein the at least one back strap includes at least two spaced-apart ones of the back straps.

9. The article defined in claim 1, wherein the energy absorber is manufactured from a sheet of material by a thermoformed process, such that the horizontal and vertical side walls are stretched to define a thinner thickness dimension than the base flange.

10. The article defined in claim 1, wherein the energy absorber includes several additional crush boxes.

11. The article defined in claim 10, wherein at least one of the crush boxes has an arcuate face surface defining a sweep.

12. The article defined in claim 1, wherein the back strap includes at least one end that is attached mechanically to one of the side walls of the crush box.

13. The article defined in claim 12, wherein the at least one end includes a snap attached configuration.

14. The article defined in claim 13, wherein an end of the back strap and a mating portion of the crush box define a hook and opening mating connection.

15. The article defined in claim 1, wherein the back strap includes at least one end attached with material bonding.

\* \* \* \* \*